(12) United States Patent
Gaylard et al.

(10) Patent No.: US 11,299,218 B2
(45) Date of Patent: Apr. 12, 2022

(54) AERODYNAMIC APPARATUS

(71) Applicant: JAGUAR LAND ROVER LIMITED, Coventry (GB)

(72) Inventors: Adrian Gaylard, Warwickshire (GB); Ross Turner, Warwickshire (GB); Matthew Beaven, Warwickshire (GB); Simon Tovey, Warwickshire (GB); Christopher Thompson, Warwickshire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 67 days.

(21) Appl. No.: 16/349,058

(22) PCT Filed: Nov. 6, 2017

(86) PCT No.: PCT/EP2017/078358
§ 371 (c)(1),
(2) Date: May 10, 2019

(87) PCT Pub. No.: WO2018/087048
PCT Pub. Date: May 17, 2018

(65) Prior Publication Data
US 2019/0270485 A1    Sep. 5, 2019

(30) Foreign Application Priority Data

Nov. 11, 2016 (GB) .................................... 1619057

(51) Int. Cl.
*B62D 35/00* (2006.01)
*B62D 25/10* (2006.01)
(Continued)

(52) U.S. Cl.
CPC ......... *B62D 35/005* (2013.01); *B62D 25/085* (2013.01); *B62D 25/105* (2013.01); *B62D 25/12* (2013.01); *F15D 1/12* (2013.01)

(58) Field of Classification Search
CPC ...... B62D 25/10; B62D 25/105; B62D 25/12; B62D 35/005
(Continued)

(56) References Cited

U.S. PATENT DOCUMENTS 4,410,032 A    10/1983    Mori
5,112,095 A    5/1992    Lund et al.
(Continued)

FOREIGN PATENT DOCUMENTS

DE         2841141 A1    4/1980
DE    102007010846 A1    9/2008
(Continued)

OTHER PUBLICATIONS

International Search Report and Written Opinion, PCT/US2017/078358, 13 pp.
(Continued)

*Primary Examiner* — Jason S Daniels
(74) *Attorney, Agent, or Firm* — McCoy Russell LLP

(57) ABSTRACT

An aerodynamic apparatus (10) for a vehicle (2), the aerodynamic apparatus comprising: a bonnet (12) having a leading edge (18) and a trailing edge (34); a bonnet spoiler (14) having a leading edge (30) and a trailing edge (32), and being positionable vertically above the bonnet (12) and separated therefrom to form an airflow duct (22) therebetween; and a grille (16) comprising a trailing edge (20) and a front face separated by a curved upper portion (28), wherein the trailing edge (20) of the grille (16) is positionable adjacent to the leading edge (18) of the bonnet (12).

20 Claims, 6 Drawing Sheets

(51) Int. Cl.
  *B62D 25/08* (2006.01)
  *F15D 1/12* (2006.01)
  *B62D 25/12* (2006.01)
(58) Field of Classification Search
  USPC .......................................... 296/180.1, 180.2
  See application file for complete search history.

(56) References Cited

U.S. PATENT DOCUMENTS

| | | | |
|---|---|---|---|
| 6,447,049 B1* | 9/2002 | Tohda | B60R 19/12 |
| | | | 296/180.1 |
| 6,926,346 B1 | 8/2005 | Wong et al. | |
| 7,922,235 B1 | 4/2011 | Smith | |
| 8,651,554 B1* | 2/2014 | Patelczyk | B60R 19/24 |
| | | | 296/136.08 |
| 10,577,034 B2* | 3/2020 | Thompson | B62D 37/02 |
| 2003/0178870 A1 | 9/2003 | Angelo et al. | |
| 2015/0321547 A1* | 11/2015 | Pickl | B62D 37/02 |
| | | | 180/68.1 |
| 2017/0021786 A1* | 1/2017 | Lee | B62D 35/005 |
| 2019/0176908 A1* | 6/2019 | Slight | B62D 35/00 |
| 2019/0233022 A1* | 8/2019 | Biancalana | B62D 35/005 |

FOREIGN PATENT DOCUMENTS

| | | |
|---|---|---|
| DE | 102015007713 A1 | 12/2016 |
| GB | 2247867 A | 3/1992 |
| GB | 2304085 A | 3/1997 |
| WO | 2016020419 A1 | 2/2016 |

OTHER PUBLICATIONS

Search and Examination Report, GB1619057.1, dated May 9, 2017, 6 pp.
Search and Examination Report, GB1619057.1, dated Nov. 8, 2017, 6 pp.

* cited by examiner

AERODYNAMIC APPARATUS

CROSS-REFERENCE TO RELATED APPLICATIONS

This application is a 371 of International Application No. PCT/EP2017/078358, filed Nov. 6, 2017, which claims priority to GB Patent Application 1619057.1 filed Nov. 11, 2016, the contents of both of which are incorporated by reference herein in their entirety.

TECHNICAL FIELD

The present disclosure relates to an aerodynamic apparatus. In particular but not exclusively the present disclosure relates to an aerodynamic apparatus for a vehicle. Aspects of the invention relate to an aerodynamic apparatus, a bonnet apparatus, a grille and a vehicle.

BACKGROUND

Vehicle airflow modification devices, such as those described in WO2016/020419, are known to control airflow over the bonnet or hood of a vehicle to reduce the size of the zone of high pressure which forms on or at the front of a moving vehicle.

SUMMARY OF THE INVENTION

Aspects of the invention are defined in the appended claims. Embodiments of the invention advantageously reduce the size of the zone of high pressure experienced by vehicles having a substantially flat front face.

BRIEF DESCRIPTION OF THE FIGURES

Embodiments of the invention will now be described by way of example only with reference to the following figures, in which.

DETAILED DESCRIPTION

Throughout the description the terms front, back, top and bottom are to be given their conventional meanings in relation to a standard forward facing of a vehicle. The terms left and right are used to describe the respective sides of the vehicle when viewed from the rear of the vehicle facing forwards towards the front.

A longitudinal axis is defined passing through the front and rear of the vehicle and parallel to a normal standing of the vehicle. A transverse axis is defined passing through the left hand and right hand sides of the vehicle perpendicular to the longitudinal axis and parallel to a normal standing of the vehicle. A vertical axis is defined passing through the top and bottom of the vehicle and perpendicular to the longitudinal and transverse axes.

Figure 1:
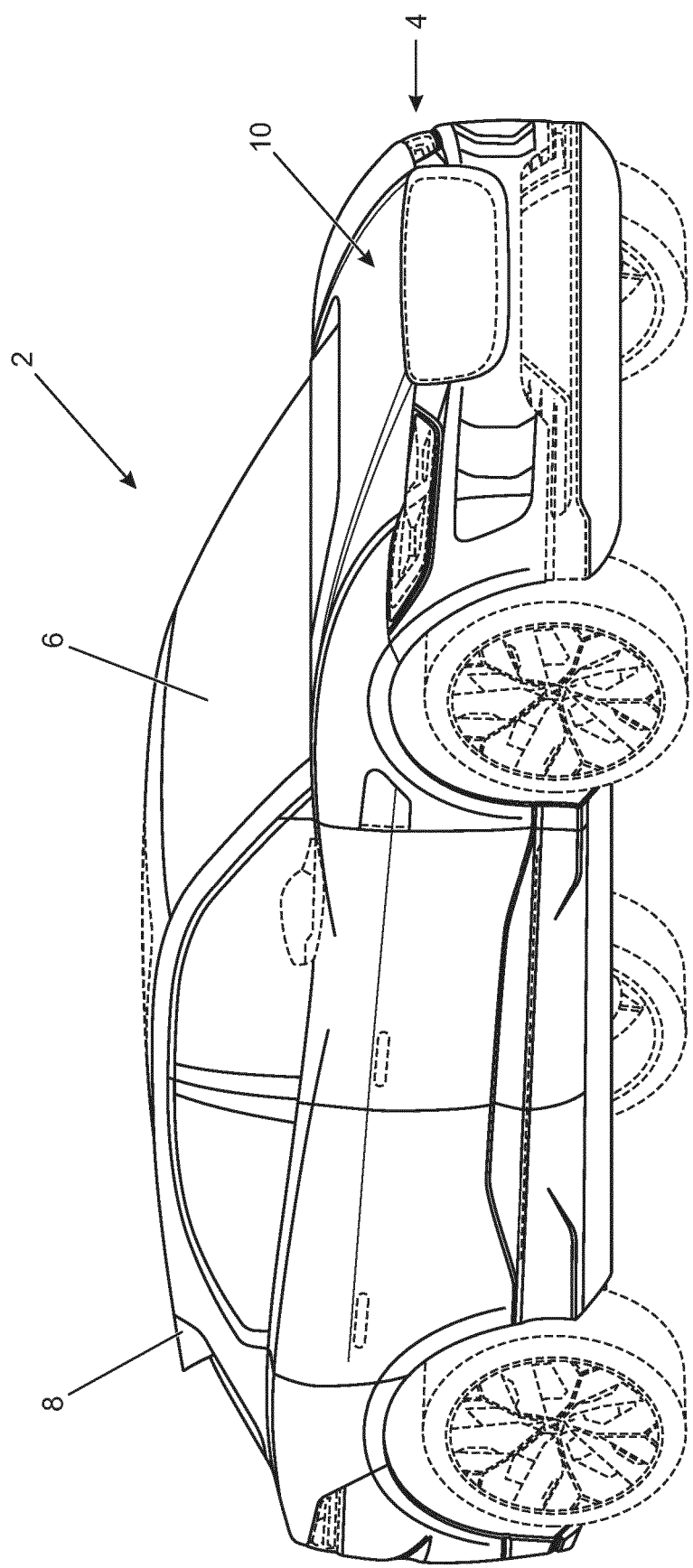
FIG. 1 schematically shows a vehicle comprising an aerodynamic apparatus according to an embodiment of the invention.

FIG. 1 shows a vehicle 2 comprising an aerodynamic apparatus 10 according to an embodiment of the invention. The aerodynamic apparatus 10 is positioned at a front end 4 of the vehicle 2 adjacent to a front windshield 6. The vehicle shown has a substantially flat front end, minimising any overhang of front body structure in front of the front wheels and arranged to provide a suitable load bearing structure, optimised to mitigate injury in the event of an impact with a pedestrian. The upper leading edge of the flat front end defines a wrap around point for a wrap around line orientated substantially parallel with the longitudinal axis of the vehicle and is the point where a longitudinal wrap around marker would fold down from a substantially vertical orientation originating on the ground in front of the vehicle, towards the upper surface of the bonnet. The terms wrap around line and wrap around distance are terms of art well understood in the field of automotive pedestrian safety. Other aerodynamic features such as a spoiler 8 are installed on the vehicle 2 but do not form part of the aerodynamic apparatus 10 according to embodiments of the present invention.

FIG. 1 also illustrates the transverse axis Y-Y, the vertical axis Z-Z and an offset longitudinal axis X'-X' rotated about the transverse axis Y-Y.

Figure 2:
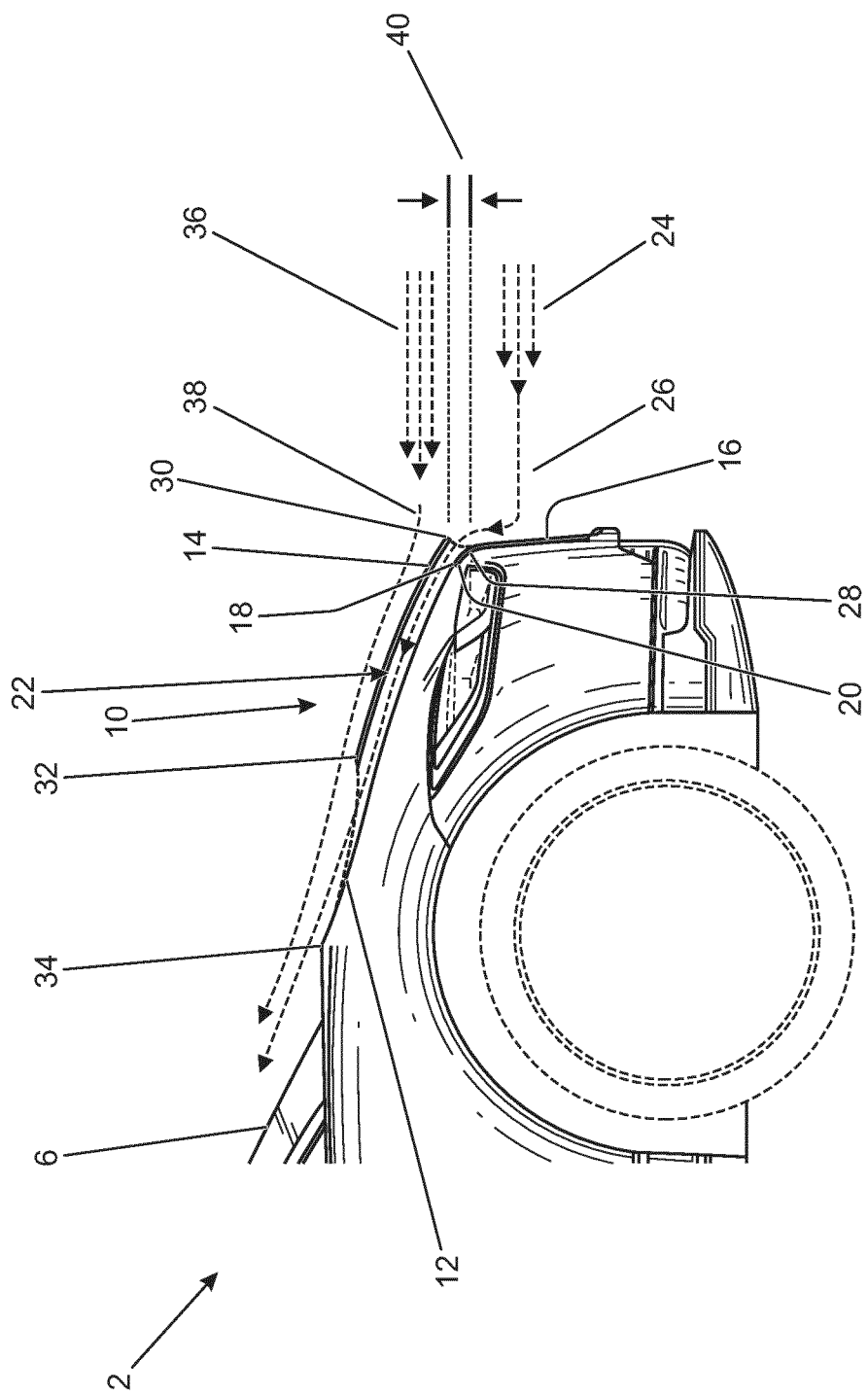
FIG. 2 shows a side view of the vehicle and a partial cross section through the plane X'-X': Z-Z of FIG. 1.

FIG. 2 shows a side view of vehicle 2 and a partial cross sectional view through a plane defined by the offset longitudinal axis X'-X' and vertical axis Z-Z. As illustrated the aerodynamic apparatus comprises a bonnet 12, a bonnet spoiler 14 and a grille 16. A leading edge 18 of the hood or bonnet 12 aerodynamically connects a trailing edge 20 of the grille 16 to the vehicle front windshield 6. The bonnet spoiler 14 is positioned vertically above the bonnet 12 and creates an airflow duct 22 therebetween.

Airflow 24 incident on the vehicle grille 16, during forward motion of the vehicle 2, is redirected 26 over a curved upper portion 28 of the grille 16. Redirected airflow 26 is gathered by a leading edge 30 of the bonnet spoiler 14 and vertically channeled through an aperture between the bonnet spoiler 14 and the bonnet 12. The airflow 26 exits the airflow duct 22 adjacent to a trailing edge 32 of the bonnet spoiler 14 and continues over a trailing edge 34 of the bonnet 12 to the front windshield 6. It will be appreciated that the grille 16 is therefore in fluid communication with the bonnet 12 and airflow duct 22. It will also be appreciated that a front face of the grille 16 is in substantially longitudinal alignment with the leading edge 30 of the bonnet spoiler 14 and advantageously creates a substantially vertical front face of the vehicle 2.

Airflow 36 incident on the upper surface of the bonnet spoiler 14, during forward motion of the vehicle, is redirected 38 similarly toward the front windshield 6 of the vehicle 2. A substantially flat profile of the upper surface of the bonnet spoiler 14 facilitates the redirected airflow 38 to flow smoothly over the bonnet spoiler 14.

The two redirected airflows 26, 38 combine adjacent to the trailing edge 32 of the bonnet spoiler 14 and continue over the vehicle 2 substantially as the air would flow in the absence of the aerodynamic apparatus 10. This advantageously provides an aerodynamic height reduction 40 of 50-100 mm of the vehicle front face without physically lowering the front face and adversely affecting the vehicular position of the wrap around point. Other height reductions are within the scope of the invention and may be provided by a smaller or larger airflow duct 22 and/or curved upper portion 28 of the grille 16. The aerodynamic height reduction 40 in turn reduces the aerodynamic drag of the vehicle 2 when moving forwards.

Figure 3:
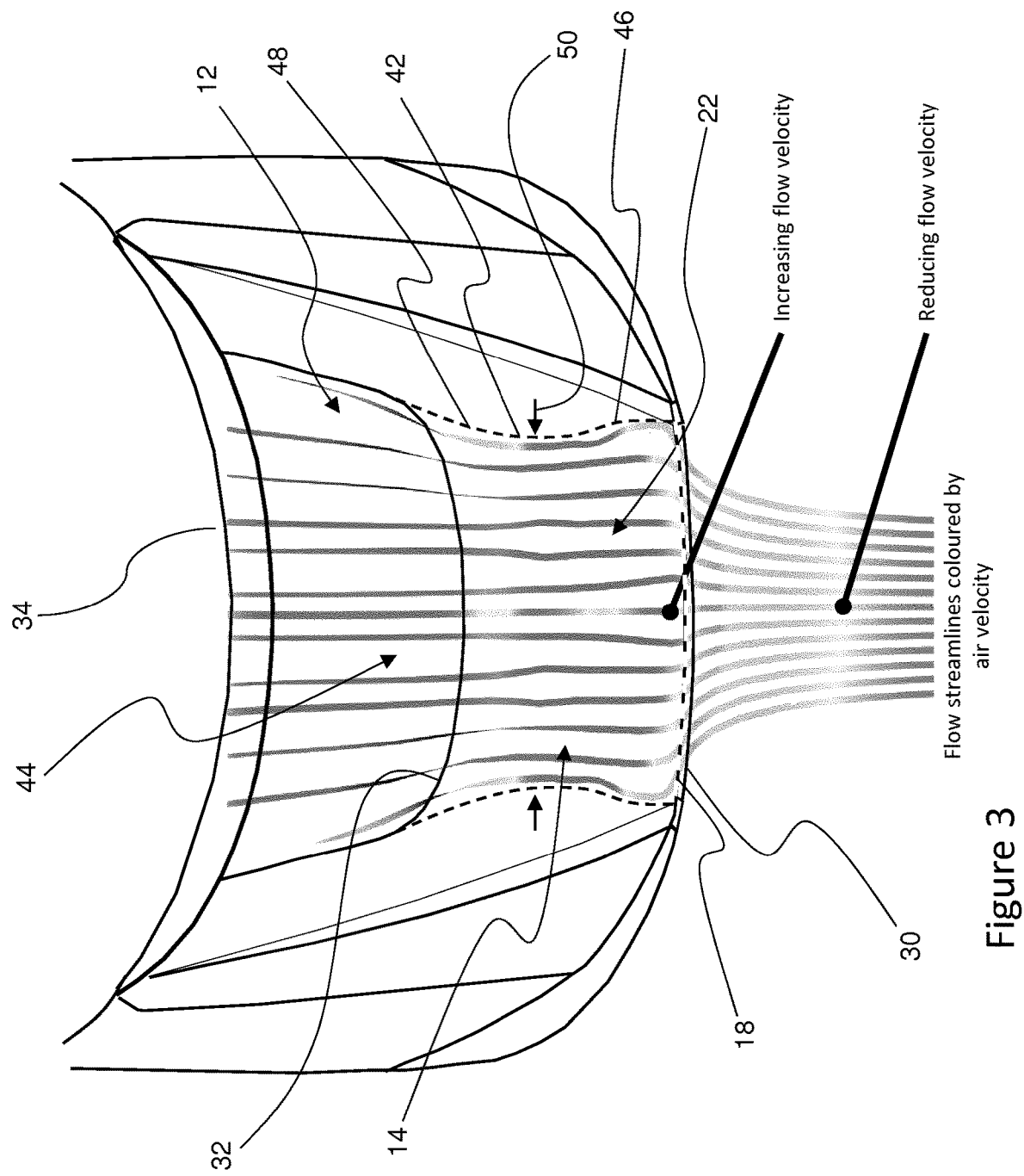
FIG. 3 shows a plan view of the vehicle and a partial cross section through the plane X'-X': Y-Y of FIG. 1.

FIG. 3 shows a plan view and partial cross-sectional view through a plane defined by the offset longitudinal axis X'-X' and transverse axis Y-Y. As illustrated the airflow duct 22 is further defined by an opposing pair of substantially vertical channel walls 42 which extend between the leading edge 18 of the bonnet 12 and the trailing edge 32 of the bonnet spoiler 14. The walls further extend to or towards the trailing edge 34 of the bonnet 12 forming an open-topped air channel 44. The depth of the open-topped air channel 44 decreases from its origin at the trailing edge 32 of the bonnet spoiler 14 to or towards the trailing edge 34 of the bonnet 12.

As illustrated in FIG. 3, moving from the front to the rear of the airflow duct 22 each channel wall 42, and thus the airflow duct 22, comprises a converging region 46 and a diverging region 48. A pinch or choke point 50 signified by the arrows 50. It will be appreciated that the pinch or choke point forms a choke or throat of a Venturi tube. Longitudinal airflow velocity through the pinch point 50 is higher than the airflow either side of the choke point.

Referring back to FIG. 2, it will be appreciated that the inlet of the airflow duct 22, at the leading edge of the bonnet 12 is narrower than outlet. The depth of the airflow duct is substantially constant throughout. This serves to increase the velocity of the redirected airflow 26 recovering longitudinal momentum lost as the incident air flow 24 slows and forms a forward high-pressure region in front of the vehicle grille 16, thus advantageously reducing the aerodynamic drag of the vehicle.

Furthermore the high velocity airflow exiting the airflow duct 22 creates an area of relatively low pressure immediately after the trailing edge 32 of the bonnet spoiler 14 when compared to the pressure of air passing over the bonnet spoiler. This area of low pressure serves to pull the airflow 38 flowing over the bonnet spoiler 14 towards the bonnet resulting in an airflow substantially attached to the trailing edge 34 of the bonnet 12 and the wind screen 6. High velocity airflow through the airflow duct passing onto the roof, via the wind screen may advantageously serve to reduce soiling i.e. the accumulation of water and/or solid material) on a rear screen of the vehicle.

The bonnet 12 and bonnet spoiler 14 of aerodynamic apparatus 10 are in some embodiments an integrated component. In other embodiments the bonnet 12 and bonnet spoiler 14 are separate components. It will be appreciated that other arrangements are also within the scope of the invention.

Figure 4:
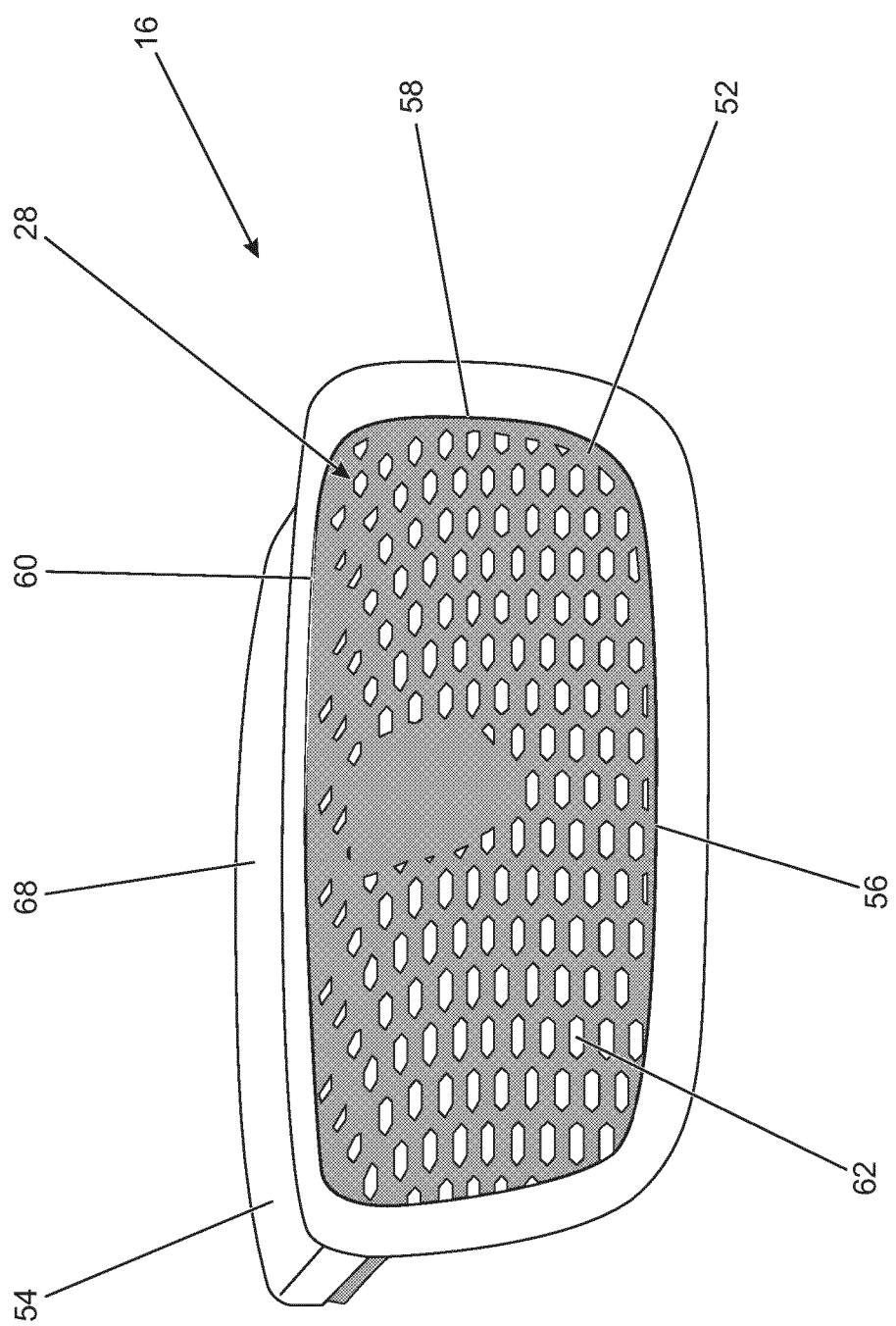
FIG. 4 shows a perspective view of a grille according to an embodiment of the invention.

As shown in FIG. 4 the grille 16 comprises a grille mesh 52 and a surround 54 which contacts the grille mesh 52 along a lower edge 56 and side edges 58 thereof. The grille mesh 52 is curved to form the curved upper portion 28 of the grille 16. The grille mesh 52 and surround 54 are separated along a top edge of the grille mesh 52 forming an aperture 60 in the grille 16. The aperture 60 opens to the airflow duct 22 as hereinbefore described as between the bonnet 12 and bonnet spoiler 14.

With reference to FIG. 1, as the vehicle 2 moves forward, mesh apertures 62 in the grille mesh 52 substantially fill up with air, effectively creating an aerodynamically solid grille surface. It will be appreciated that some air continues to flows through the grille mesh 52 for the grille to perform its function of allowing air into an engine bay of the vehicle, over a radiator or otherwise. However, as the mesh apertures 62 fill, the curved surface of the grille becomes aerodynamically smooth and promotes airflow through the aperture 60 into the airflow duct 22 and provides the aforementioned aerodynamic benefits.

Figure 5:
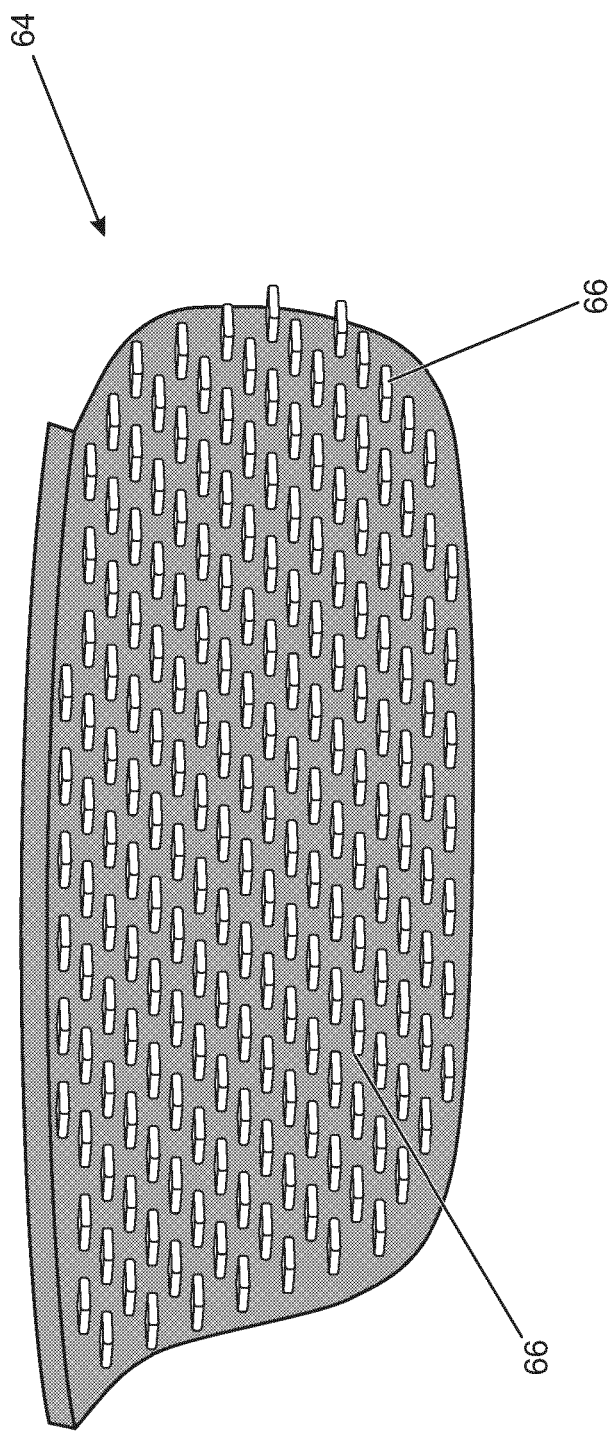
FIG. 5 shows a perspective view of secondary mesh of a grille according to an embodiment of the invention.

In some embodiments the grille 16 comprises a secondary mesh 64 as shown in FIG. 5, which comprises fingers 66. In the example shown, these fingers 66 project substantially horizontally towards the front of the vehicle 2. These fingers 66 are each positionable within the mesh apertures 62 in the grille mesh 52. In some embodiments the fingers 66 promote the air filling of the mesh apertures 62. It will be appreciated that the secondary mesh 64 is, in some embodiments, movable with respect to the grille mesh 52 to vary the amount of filling of the mesh apertures 62 and in turn vary the flow through the mesh apertures 62 into the engine bay, over the radiator, or otherwise.

With reference to FIGS. 1 and 4, a top 68 of surround 54 abuts the bonnet spoiler 14 to form an aerodynamically smooth surface. In some embodiments a notch (not shown) or other suitable corresponding formation is provided in the underside of the bonnet spoiler to collocate and cooperate with the top 68 of the surround 54. This is advantageous in that any ridges between components are eliminated so that turbulent airflow is mitigated.

Figure 6:
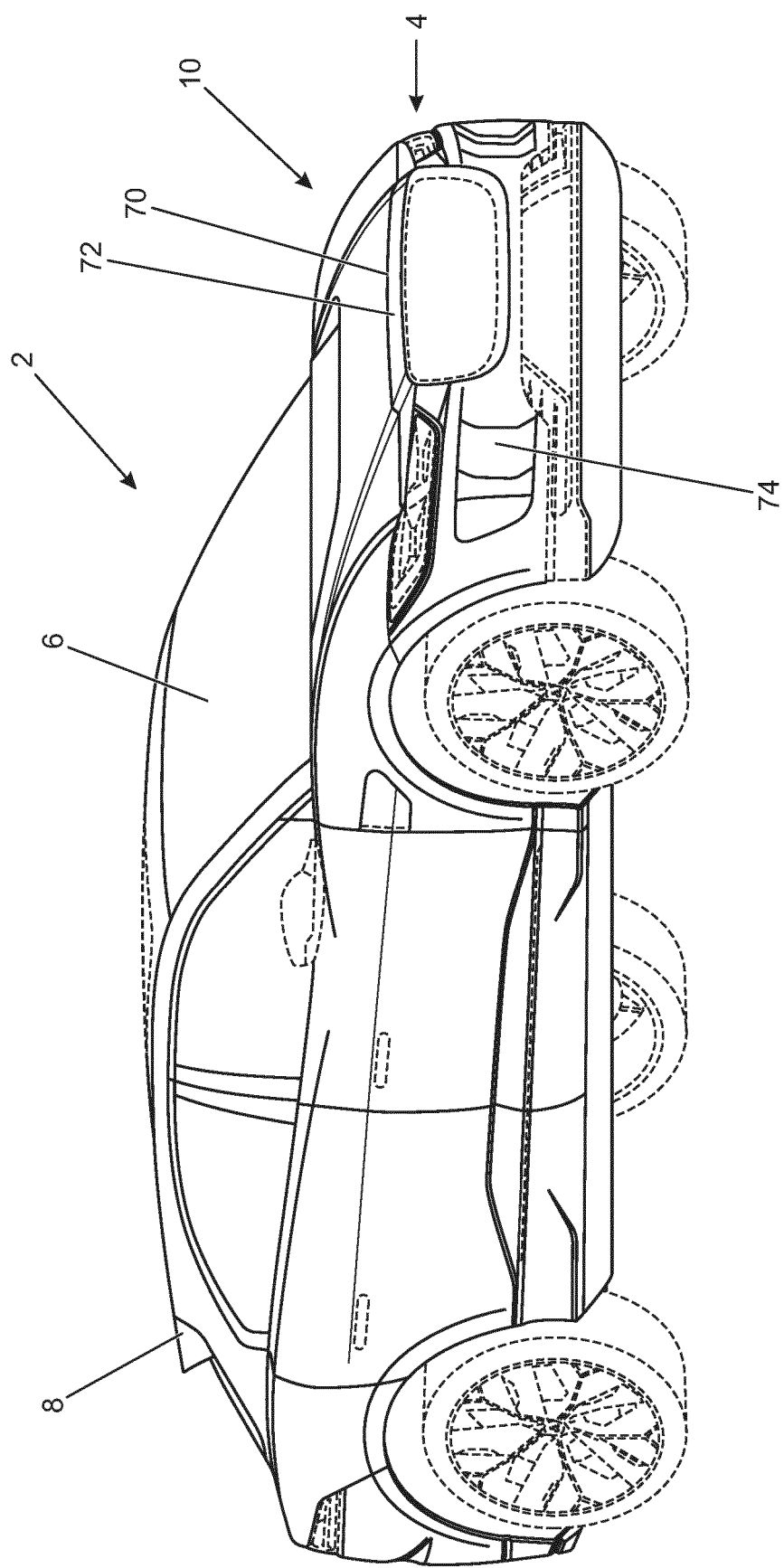
FIG. 6 schematically shows a vehicle comprising an aerodynamic apparatus according to an embodiment of the invention.

In some embodiments the bonnet 12 and bonnet spoiler 14 are formed by two components each integrally comprising a portion of the bonnet 12 and bonnet spoiler 14. As illustrated in FIG. 6 these embodiments feature a divide, or shut line, 70 between the components and positioned adjacent to the trailing edge of the grille. In some embodiments the forward most integral bonnet and bonnet spoiler component 72 is integral to a front bumper 74 of the vehicle. In these embodiments the aerodynamic apparatus comprises the front bumper of the vehicle. This may be advantageous to facilitate assembly and reduce design complexity for a hinged bonnet. Further, this facilitates alignment of the component parts of the aerodynamic apparatus during assembly, enhancing its visual appearance.

In embodiments of the invention the aforementioned bonnet 12, bonnet spoiler 14 and grille surround 54 comprises a metal material, for example, aluminium. In other embodiments the aforementioned bonnet 12, bonnet spoiler 14 and grille surround 54 comprises a composite material, for example, glass reinforced plastic. In embodiments of the invention the grille mesh 52 and secondary mesh comprises a plastic or composite material, for example, glass reinforced plastic. Other materials may be useful and are within the scope of the invention.

In an embodiment of the invention a bonnet apparatus comprises a bonnet having a leading edge and a trailing edge; and a bonnet spoiler having a leading edge and a trailing edge, and being positionable vertically above the bonnet and separated therefrom to form an airflow duct therebetween, wherein the trailing edge of the bonnet spoiler is longitudinally positionable between the leading and trailing edges of the bonnet. In embodiments of the invention the bonnet apparatus comprises aforementioned features of the bonnet 12 and bonnet spoiler 14.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. An aerodynamic apparatus for a vehicle, the aerodynamic apparatus comprising:
   a bonnet having a leading edge and a trailing edge;
   a bonnet spoiler having a leading edge and a trailing edge, and being positioned vertically above the bonnet and separated therefrom to form an airflow duct therebetween; and
   a grille comprising a trailing edge and a front face separated by a curved upper portion, wherein the trailing edge of the grille is positionable adjacent the leading edge of the bonnet,
   wherein the airflow duct comprises channel walls laterally converging from the leading edge of the bonnet spoiler to form a choke point and laterally diverging from the choke point to the trailing edge of the bonnet spoiler.

2. An aerodynamic apparatus as claimed in claim 1, wherein the channel walls continue to laterally diverge from the trailing edge of the bonnet spoiler towards the trailing edge of the bonnet to form an open-topped air channel on the bonnet.

3. An aerodynamic apparatus as claimed in claim 2, wherein the open-topped air channel decreases in depth from the trailing edge of the bonnet spoiler towards the trailing edge of the bonnet.

4. An aerodynamic apparatus as claimed in claim 1, wherein the airflow duct is a substantially constant depth throughout.

5. An aerodynamic apparatus as claimed in claim 1, wherein the grille comprises a grille surround and a grille mesh and wherein a top of the grille surround is positionable in a corresponding formation formed in the bonnet spoiler.

6. An aerodynamic apparatus as claimed in claim 5, wherein the grille comprises a secondary mesh which comprises a plurality of fingers arranged to locate within mesh apertures in the grille mesh.

7. An aerodynamic apparatus as claimed in claim 6, wherein the secondary mesh is longitudinally movable in relation to the grille mesh.

8. An aerodynamic apparatus as claimed in claim 1, wherein the bonnet and bonnet spoiler are formed by two components each integrally comprising a portion of the bonnet and bonnet spoiler.

9. An aerodynamic apparatus for a vehicle and as claimed in claim 8, wherein one of the two components is integral with a bumper of the vehicle.

10. A vehicle comprising an aerodynamic apparatus comprising the features of the aerodynamic apparatus as claimed in claim 1.

11. An aerodynamic apparatus for a vehicle, the aerodynamic apparatus comprising:
    a bonnet having a leading edge and a trailing edge;
    a bonnet spoiler having a leading edge and a trailing edge, and being positioned vertically above the bonnet and separated therefrom to form an airflow duct therebetween; and
    a grille comprising a trailing edge and a front face separated by a curved upper portion, wherein the trailing edge of the grille is positionable adjacent the leading edge of the bonnet,
    wherein the front face of the grille is substantially longitudinally aligned with the leading edge of the bonnet spoiler so that the leading edge of the bonnet spoiler lies in substantially the same plane as that defined by the front face of the grille and so that the trailing edge of the grille is longitudinally offset from the leading edge of the bonnet spoiler, and
    wherein the grille comprises a grille surround and a grille mesh and wherein a top of the grille surround is positionable in a corresponding formation formed in the bonnet spoiler.

12. An aerodynamic apparatus as claimed in claim 11, wherein the trailing edge of the bonnet spoiler is longitudinally positionable between the leading and trailing edges of the bonnet.

13. An aerodynamic apparatus as claimed in claim 11, wherein the airflow duct comprises channel walls laterally converging from the leading edge of the bonnet spoiler to form a choke point and laterally diverging from the choke point to the trailing edge of the bonnet spoiler.

14. An aerodynamic apparatus as claimed in claim 11, wherein the airflow duct is a substantially constant depth throughout.

15. An aerodynamic apparatus as claimed in claim 11, wherein the grille comprises a secondary mesh which comprises a plurality of fingers arranged to locate within mesh apertures in the grille mesh.

16. An aerodynamic apparatus as claimed in claim 15, wherein the secondary mesh is longitudinally movable in relation to the grille mesh.

17. A vehicle comprising an aerodynamic apparatus comprising the features of the aerodynamic apparatus as claimed in claim 11.

18. An aerodynamic apparatus for a vehicle, the aerodynamic apparatus comprising:
    a bonnet having a leading edge and a trailing edge;
    a bonnet spoiler having a leading edge and a trailing edge, and being positioned vertically above the bonnet and separated therefrom to form an airflow duct therebetween; and
    a grille comprising a trailing edge and a front face separated by a curved upper portion, wherein the trailing edge of the grille is positionable adjacent the leading edge of the bonnet,
    wherein the front face of the grille is substantially longitudinally aligned with the leading edge of the bonnet spoiler so that the leading edge of the bonnet spoiler lies in substantially the same plane as that defined by the front face of the grille and so that the trailing edge of the grille is longitudinally offset from the leading edge of the bonnet spoiler, and
    wherein the bonnet and bonnet spoiler are formed by two components each integrally comprising a portion of the bonnet and bonnet spoiler.

19. An aerodynamic apparatus for a vehicle and as claimed in claim 18, wherein one of the integral components is integral with a bumper of the vehicle.

20. A vehicle comprising an aerodynamic apparatus comprising the features of the aerodynamic apparatus as claimed in claim 18.

\* \* \* \* \*